United States Patent
Clemen, Jr. et al.

(10) Patent No.: US 9,415,745 B1
(45) Date of Patent: Aug. 16, 2016

(54) HIGH INTENSITY LIGHT SOURCE BLOCKING SYSTEM AND METHOD

(75) Inventors: Mark Joseph Clemen, Jr., Bremerton, WA (US); Alan F. Stewart, Renton, WA (US); Keith John Davis, Seattle, WA (US); Mark Stewart Wilenski, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 552 days.

(21) Appl. No.: 13/491,691

(22) Filed: Jun. 8, 2012

(51) Int. Cl.
| | |
|---|---|
| *B60R 22/00* | (2006.01) |
| *E05F 15/00* | (2015.01) |
| *G05D 1/00* | (2006.01) |
| *G05D 3/00* | (2006.01) |
| *G06F 7/00* | (2006.01) |
| *G06F 17/00* | (2006.01) |

(52) U.S. Cl.
CPC ...................................... *B60R 22/00* (2013.01)

(58) Field of Classification Search
CPC ........... B60R 22/00; E05F 15/00; G05D 1/00; G05D 3/00; G06F 7/00; G06F 17/00
See application file for complete search history.

(56) References Cited

U.S. PATENT DOCUMENTS

| | | | |
|---|---|---|---|
| 5,270,748 A | 12/1993 | Katz | |
| 5,298,732 A | 3/1994 | Chen | |
| 5,305,012 A | 4/1994 | Faris | |
| 5,430,505 A | 7/1995 | Katz | |
| 6,231,187 B1 | 5/2001 | Munoz et al. | |
| 6,243,076 B1 | 6/2001 | Hatfield | |
| 6,643,050 B2 | 11/2003 | Rukavina et al. | |
| 6,847,336 B1 | 1/2005 | Lemelson et al. | |
| 7,119,767 B1 | 10/2006 | Komiya et al. | |
| 7,347,551 B2 | 3/2008 | Fergason et al. | |
| 7,356,969 B1 | 4/2008 | Yurth et al. | |
| 7,391,887 B2 | 6/2008 | Durnell | |
| 7,508,344 B2* | 3/2009 | Stroud | G01S 5/06 342/387 |
| 7,553,021 B2 | 6/2009 | Fergason et al. | |
| 7,618,144 B2 | 11/2009 | Hutchin | |
| 7,651,220 B1* | 1/2010 | Pattikonda | G02C 7/101 351/159.6 |
| 7,961,301 B2* | 6/2011 | Earhart | G01S 3/7867 356/4.01 |
| 8,113,657 B2 | 2/2012 | Eberl et al. | |
| 8,140,219 B2 | 3/2012 | Cernasov | |
| 8,194,986 B2* | 6/2012 | Conwell | G06F 17/30265 382/224 |
| 8,385,971 B2* | 2/2013 | Rhoads | G06F 17/30244 382/162 |
| 8,393,964 B2* | 3/2013 | Huang | A63F 13/02 463/36 |
| 8,467,133 B2* | 6/2013 | Miller | G02B 27/017 353/28 |

(Continued)

*Primary Examiner* — John R Olszewski
*Assistant Examiner* — Jean-Paul Cass
(74) *Attorney, Agent, or Firm* — Baldauff IP, LLC; Michael J. Baldauff, Jr.

(57) ABSTRACT

A high intensity light source blocking system for a vehicle operated by a crew member within a cockpit includes an crew member position or eye-position detection system, a transparent dynamic-darkening display covering a window in the crew member cockpit, and a scene imager configured to detect a presence of a high intensity light source and an emanation direction relative to the crew member cockpit. A computing device is connected to the position or eye-position detection system, the transparent dynamic-darkening display and the scene imager, and controls the darkening of a portion of the dynamic-darkening display upon the occurrence of either the high intensity light source having an intensity value equal to or greater than a predetermined threshold, or the crew member position or eye-position being subject to either a direct portion of the high intensity light source or a substantial reflection thereof off a surface within the crew member cockpit.

21 Claims, 7 Drawing Sheets

(56) References Cited

U.S. PATENT DOCUMENTS

| | | | |
|---|---|---|---|
| 8,472,120 B2* | 6/2013 | Border | G02B 27/0093 353/28 |
| 8,538,636 B2* | 9/2013 | Breed | B60N 2/002 315/77 |
| 8,696,113 B2* | 4/2014 | Lewis | G06F 3/011 345/8 |
| 8,855,729 B1* | 10/2014 | Pattikonda | H04B 1/385 455/550.1 |
| 9,010,929 B2* | 4/2015 | Lewis | G02C 11/10 345/7 |
| 2005/0162575 A1* | 7/2005 | Harvie | A61F 9/022 349/16 |
| 2006/0175859 A1 | 8/2006 | Isaac | |
| 2008/0294315 A1* | 11/2008 | Breed | B60N 2/002 701/49 |
| 2009/0080712 A1* | 3/2009 | D'Souza | G06K 9/00771 382/117 |
| 2009/0112407 A1* | 4/2009 | Kneller | B64D 11/0624 701/45 |
| 2011/0093411 A1* | 4/2011 | Gibson | G06Q 99/00 705/500 |
| 2012/0116632 A1* | 5/2012 | Bechtel | B60Q 1/1423 701/36 |

* cited by examiner

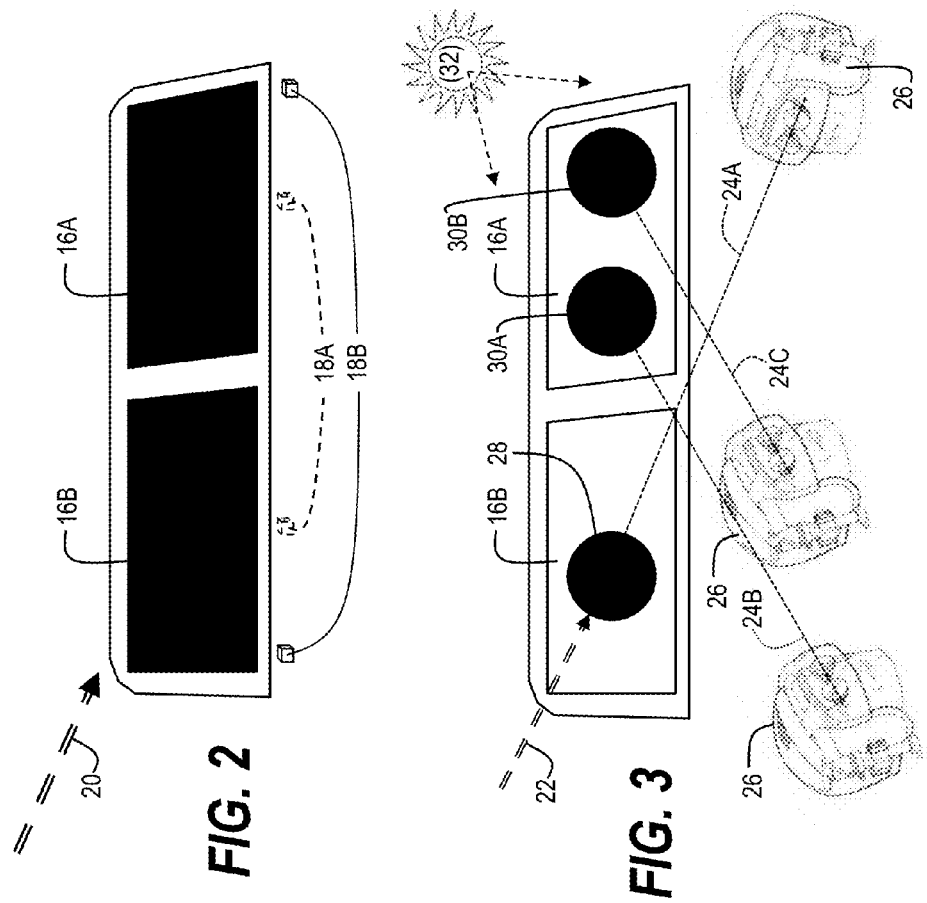
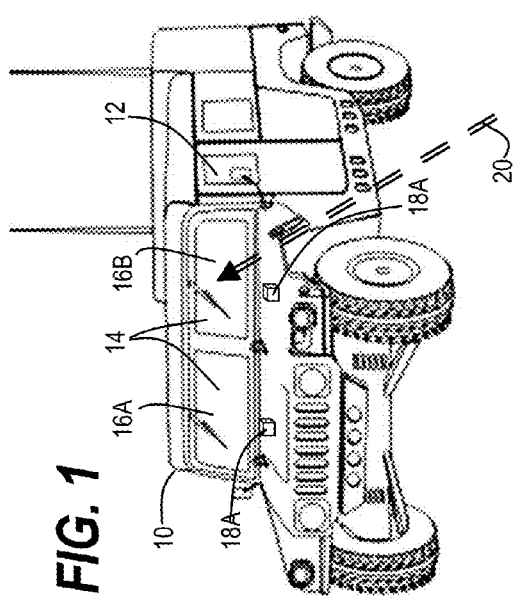
FIG. 1
FIG. 2
FIG. 3

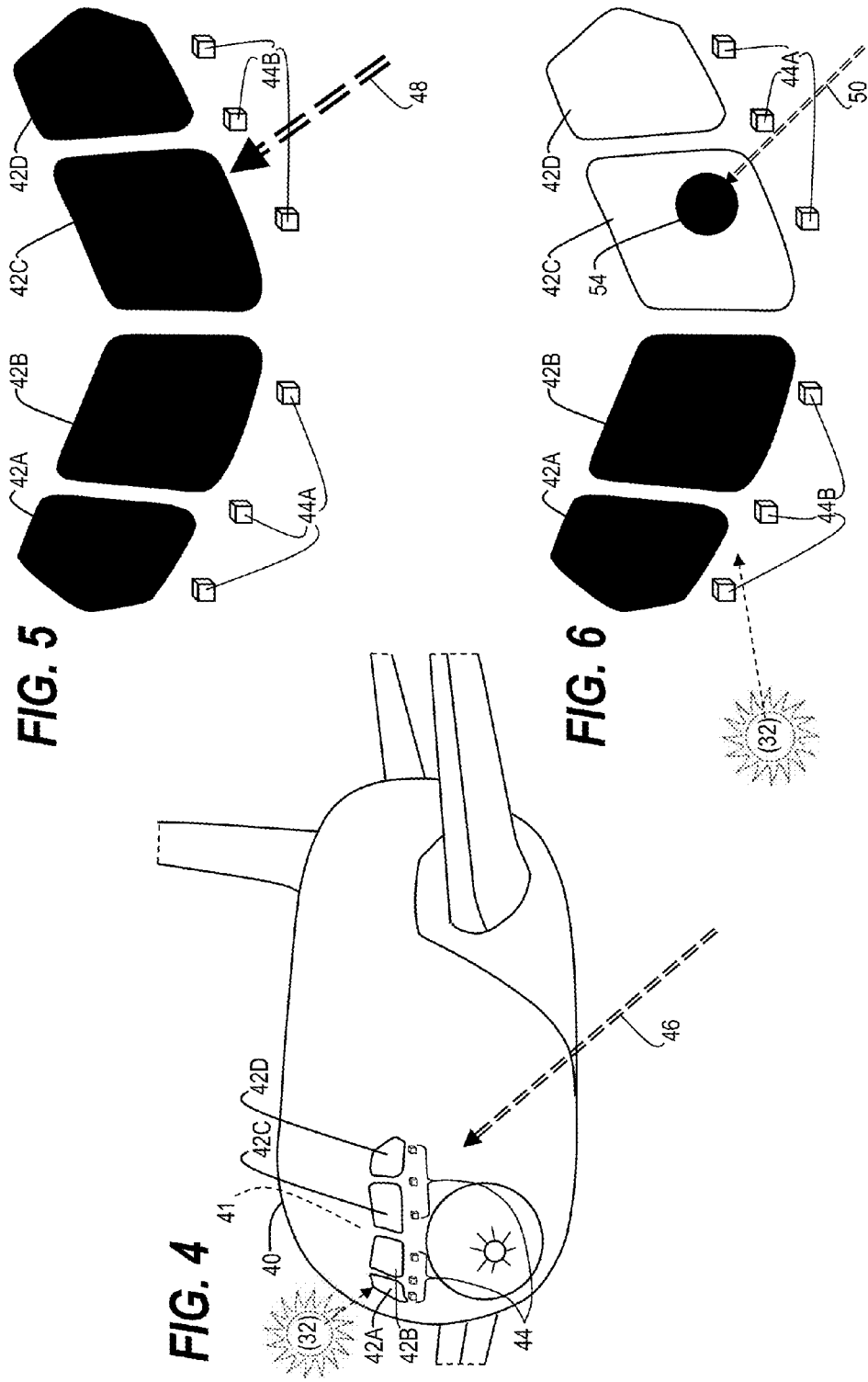

HIGH INTENSITY LIGHT SOURCE BLOCKING SYSTEM AND METHOD

TECHNICAL FIELD

The field of the embodiments presented herein is directed toward systems and methods for the protection of vehicle crew members against existing and future high intensity light source threats such as laser and photonic weapons.

BACKGROUND

High intensity light sources such as laser and other photonic weapon threats jeopardize crew members' vision as they operate vehicles in different operational scenarios.

These emerging light source threats span a broad range in wavelength and intensity levels. The first type of weapon includes dazzler weapon threats that include light sources that are near or below eye damaging intensity but whose effectiveness lies in distracting the vehicle crew members from the timely execution of mission duties. A second type of weapon includes high intensity light source threats that are at or above eye damaging intensity and may leave permanent damage to crew members' eyes.

There is a need for a system that protects vehicle crew members' eyes from both of these types of threats on a platform that is responsive and allows for the crew members to maintain their operational duties within a vehicle. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein, a high intensity light source blocking system for a vehicle operated by a crew member within a crew member cockpit includes an eye-position detection system that outputs a crew member eye-position relative to the crew member cockpit, a transparent dynamic-darkening display covering at least one window in the crew member cockpit and a scene imager system having a scene imager either external to or within the crew member cockpit. The scene imager system is configured to detect a presence of a high intensity light source and an emanation direction of the high intensity light source relative to the crew member cockpit. A computing device is connected to the eye-position detection system, the transparent dynamic-darkening display and the scene imager system, and controls the darkening of a portion of the dynamic-darkening display upon the occurrence of either the high intensity light source having an intensity value equal to or greater than a predetermined threshold, or the crew member eye-position being subject to either at least a direct portion of the high intensity light source, or a substantial reflection of at least a portion of the high intensity light source reflected from a surface within the crew member cockpit.

In another embodiment disclosed herein, a high intensity light source blocking system for an aircraft operated by a crew member within a crew member cockpit includes an eye-position detection system that outputs a crew member eye-position relative to the crew member cockpit, a transparent dynamic-darkening display canopy covering the crew member cockpit, and a scene imager system having at least one scene imager either external to or within the crew member cockpit. The scene imager system is configured to detect a presence of a high intensity light source and an emanation direction of the high intensity light source relative to the crew member cockpit. A computing device is connected to the eye-position detection system, the transparent dynamic-darkening display canopy and the scene imager system, and controls the darkening of a portion of the dynamic-darkening display canopy upon the occurrence of either the high intensity light source having an intensity value equal to or greater than a predetermined threshold, or the crew member eye-position being subject to either a direct portion of the high intensity light source, or a substantial reflection of at least a portion of the high intensity light source reflected from a surface within the crew member cockpit.

In another embodiment disclosed herein, a method dynamically darkens an active window canopy of a crew member cockpit of an aircraft by detecting a high intensity light source that may impinge on an active window canopy of a crew member cockpit. The entire active window canopy is darkened based on detecting the high intensity light source and determines whether the high intensity light source is above an intensity threshold. A direction of the high intensity light source is determined relative to the active window canopy of the crew member cockpit. The active window canopy is then made transparent while darkening only a portion of the active window canopy at a first location on the active window canopy based upon determining the direction of the high intensity light source and determining a relative position of at least one crew member in the crew member cockpit.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein:

FIG. 1 illustrates a first embodiment of a high intensity light source blocking system on a vehicle as disclosed herein;

FIG. 2 illustrates the first embodiment of the high intensity light source blocking system operating on a vehicle window from a crew member interior view as disclosed herein;

FIG. 3 illustrates the first embodiment of the high intensity light source blocking system operating on a vehicle window from a crew member interior view as disclosed herein;

FIG. 4 illustrates a second embodiment of a high intensity light source blocking system on an aircraft as disclosed herein;

FIG. 5 illustrates the second embodiment of the high intensity light source blocking system operating on a series of windows as disclosed herein;

FIG. 6 illustrates the second embodiment of the high intensity light source blocking system operating on a series of windows as disclosed herein;

DETAILED DESCRIPTION

Figure 7:
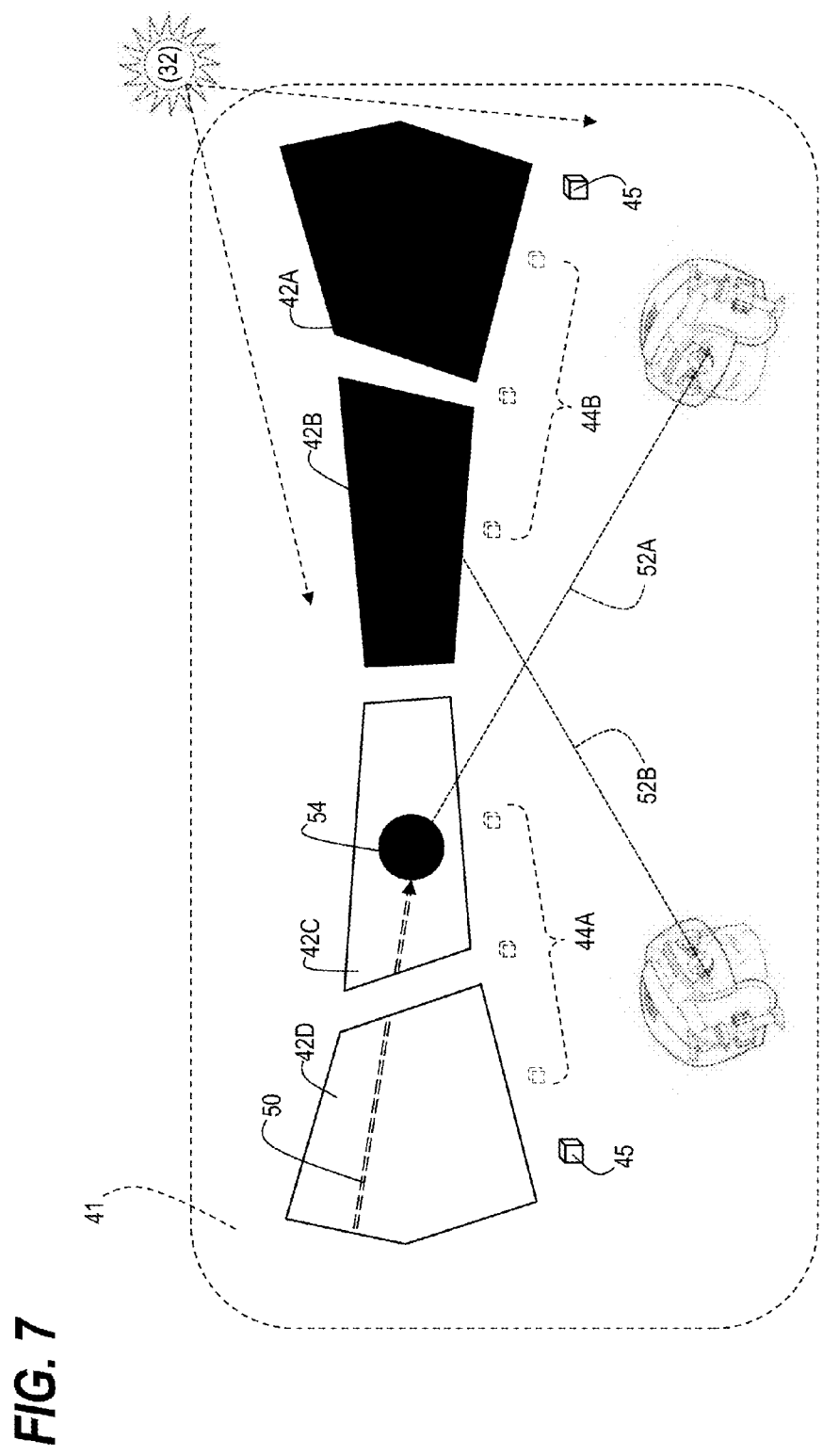
FIG. 7 illustrates the second embodiment of the high intensity light source blocking system operating on a series of windows from a crew member cockpit view as disclosed herein.

The following detailed description is directed to systems and methods for the protection of vehicle crew members against existing and future high intensity light sources threats such as laser and photonic weapons.

The embodiments presented herein protect vehicle crew member vision from dazzle energy light sources due to travel directly into dispersed threats, such as sunlight and man-made focused light sources, while retaining nearly all of the window or canopy transparency.

An active display may be integrated into a window, a number of windows or a canopy of a vehicle to provide rapid computer controlled protective response along the threat line-of-sight. The speed of response of the screen may be balanced against the pixilation sizes and the potential for introducing color into the transparent plurality. The benefit of faster response may lead the choice of a monochrome implementation. Liquid Crystal Display (LCD) technology is easily made flexible and conformal, while electrochromic technology may be more resistant to very high intensity light sources given its reflective nature. Other technologies that have controllable transparency may also be used in this application, such as piezoelectric switching.

An off-the-shelf scene imaging system may provide a broad dynamic range, wavelength response and night-vision capability. Fast frame rates will allow for fast system response times and good survivability to high power density. A pencil beam sized high intensity light source threat may be recognized by the scene imaging system via the small amount of larger divergence incoherent light typical from such high power lasers.

The system will be integrated under computer control and may include helmet integrated sensors that provide eye location or eye position to provide line-of-sight protection to the aircrew faster than the blink response of the eye, while maintaining the spot protection as long as the high intensity light source is on. This active window or canopy protection may also double in function as a line-of-sight sunshade for the crew members in the vehicle cockpit. This active window may also double in function as a heads-up display, providing flight information, vehicle diagnostics, or even shading and coloring of combat scenes according to known alliances.

The system is designed to protect against broad illumination where a directed energy beam may or may not intersect a platform as a pencil-size beam, where at altitude, the beam footprint may be in square meters. Without making an entire canopy or visor dark, the system must be able to provide accurate and directional aircrew protection between the crew member eyes and the light source threat. The system is designed to protect against wide wavelength bands, and against frequency agile sources. Sensitivity and detection of the scene imagers must be rapid and broadband. The system is also designed to protect against low power density light sources.

Scene imaging also enables exploitation of threat angles for the geo-location of high intensity light source threats. The geo-location of these threats allows tracking and potentially engaging high intensity light source weapons by location.

FIG. 1 illustrates a first embodiment of a high intensity light source blocking system on a vehicle 10 having a crew member cockpit 12 from which crew members operate the vehicle 10. At least one window 14 is on the vehicle 10 for crew members to obtain visual information for operating the vehicle 10 and obtaining situational awareness. Each window 14 additionally includes a transparent dynamic-darkening display 16A and 16B that may include a plurality of addressable LCD elements or electrochromic elements. A scene imager system includes at least one scene imager 18A, generally consisting of a wide range photo-detector, mounted on an external portion of the vehicle 10 that detects a high intensity light source 20 directed toward the windows 14 of the crew member cockpit 12 of the vehicle 10. The scene imagers presented herein may detect both the presence and direction of an incoming high intensity light source based on a direct detection of the source or detecting a scattered portion of the light source. A scene imager 18B, (as shown in FIG. 2), may also be mounted on an internal portion of the cabin or cockpit of the vehicle configured to capture any incoming high intensity light sources directed through the windows 14 and any reflections of the high intensity light sources off surfaces within the crew member cockpit 12 of the vehicle 10.

FIG. 2 illustrates the first embodiment of the high intensity light source blocking system operating on a vehicle window from a crew member interior view. According to this embodiment, the externally 18A and internally 18B mounted scene imagers detect and calculate a high intensity light source 20 having an intensity value above some predetermined threshold value such that the transparent dynamic-darkening display 16A and 16B completely darkens each panel of the window 14 to prevent damage to crew members' eyesight. The predetermined threshold value may be determined by a photo-detector or spectral intensity detector that measures the intensity and/or a particular frequency or frequencies of the incoming high intensity light source 20.

FIG. 3 illustrates the first embodiment of the high intensity light source blocking system operating on a vehicle window from a crew member interior view where a high intensity light source 22 that is below a predetermined threshold activates the transparent dynamic-darkening display 16A and 16B to darken only a portion of a window 14 based on a crew member relative position within the vehicle or alternatively a crew member eye-position 24A, 24B, 24C generated by a crew member position/eye-position detection system (not shown) that may include eye-position hardware such as integrated sensors in each crew member helmet 26. Additionally, the crew member position/eye-position detection system may include sensors mounted apart from a crew member helmet 26 on an interior portion of the crew member cockpit 12 that determine a crew member position/eye-position for at least one crew member. This cockpit mounted crew member position/eye-position sensor may include a crew member proximity detecting ultrasonic transducer, a video imager or any other sensor that is capable of determining the crew member's position/eye-position relative to the interior of the crew member cockpit 12.

When a high intensity light source 22 is detected by the external and internal scene imagers 18A/18B, (as shown in FIG. 2), a crew member position/eye-position 24A is detected and a determination is made whether the crew member's position/eye-position is subject to a direct portion of the high intensity light source 22 on the left-most portion of the window 14 at the transparent dynamic-darkening display 16B. An addressable portion 28 of the transparent dynamic-darkening display 16B, or the entire display like 16B, based on the width of the light source, is immediately darkened to protect the crew members' eyes and prevent dazzling by the high intensity light source 22. Additionally, the transparent dynamic-darkening display 16B may darken an addressable portion 28 based on a reflected portion of the high intensity light source 22 being reflected off an interior surface of the crew member cockpit 12 into the crew member position/eye-position 24A. Alternatively, the embodiment disclosed here may cause the darkening of a number of addressable portions 30A and 30B of the transparent dynamic-darkening display 16A that correspond to a second crew member position/eye-position 24B and a third crew member position/eye-position 24C that are directed to the same window 14 section of the transparent dynamic-darkening display 16A as a result of a high intensity light source, for example, in this case sunlight 32. The transparent dynamic-darkening display 16A may darken an addressable portion 30A/30B based on a reflected portion of the sunlight 32 being reflected off an interior surface of the crew member cockpit 12 into the crew member position/eye-position 24B/24C.

FIG. 4 illustrates a second embodiment of a high intensity light source blocking system on an aircraft 40 where each of number of crew cockpit windows contain an independent transparent dynamic-darkening display 42A, 42B, 42C and 42D. A scene imager system including an array of scene imagers 44 are positioned outside the cockpit 41 around the windows to detect any incoming high intensity light sources, and inside the cockpit to detect any direct, scattered or reflected high intensity light, whether from a LASER emitter 46 or sunlight 32.

FIG. 5 illustrates the second embodiment of the high intensity light source blocking system operating on a series of windows where a high intensity light source 48 is aimed at the cockpit 41. The array of scene imagers 44A/44B determine that the intensity of the light source is above a predetermined threshold and thereby darkens all of the transparent dynamic-darkening displays 42A, 42B, 42C and 42D to prevent damage to the crew members' eyes inside the crew member cockpit.

FIG. 6 illustrates the second embodiment of the high intensity light source blocking system operating on a series of windows where a first portion of the scene imagers 44A detect a high intensity light source 50 and darken a portion on the transparent dynamic-darkening display 42C as a result of a crew members position/eye-position being in the path of a particular portion on the transparent dynamic-darkening display. Additionally, for illustrative purpose, a second portion of the scene imagers 44B detect a high intensity light source 32, the sun, for example, and based on crew member positions/eye-positions within the crew member cockpit 41, darken the entire relevant windows and their respective transparent dynamically-darkening display, in this case transparent dynamic-darkening displays 42A and 42B. This is a variation of the embodiment disclosed in FIG. 3 in that the entire transparent dynamic-darkening display may be darkened to prevent excess light from entering the crew member cockpit 41 if necessary.

FIG. 7 illustrates the second embodiment of the high intensity light source blocking system of operating on a series of windows of FIG. 6 from the view of a crew member cockpit 41, where the high intensity light source 50 is directed at a portion of the transparent dynamic-darkening display 42C that happens to coincide with one crew members' position/eye-position 52A. A darkened portion 54 is generated on the transparent dynamic-darkening display 42C and may dynamically move based on the crew members' position/eye-position 52A and the direction of the high intensity light source 50 as it enters the cockpit 41. Scene imagers 45 are internally mounted within the cockpit 41 and work in conjunction with the externally mounted scene imagers 44A/44B to detect the presence and direction of any direct, scattered or reflected high intensity light sources that may enter the cockpit 41. These internally mounted scene imagers 45 provide additional feedback that allow the transparent dynamic-darkening display to darken portions that prevent direct, scattered or reflected light sources from traveling to the crew member's position/eye-position.

Additionally, when another high intensity light source having a broad illumination coverage, for example the sun 32, shines on an area that includes a number of windows 42A and 42B each containing the transparent dynamic-darkening display, the system may block either a portion of the transparent dynamic-darkening display like the round shaped darkened portion 54 based on the direct path of the light to the crew member's position/eye-position, the entire window(s) 42A and 42B to a substantially complete opaque level, or the entire window(s) 42A and 42B to a partial light transmission level, that is, a partial greying of the window. This minimizes any amount of reflective backscattering within the crew member cockpit that a high intensity light source would introduce into the cockpit. These options may be determined based on a type of aircraft or vehicle, type of mission being carried out in the aircraft or vehicle, or for certain atmospheric conditions.

A summary of the embodiments presented in FIGS. 1-7, includes a high intensity light source blocking system for a vehicle operated by a crew member within a crew member cockpit. The system includes a crew member position/eye-position detection sub-system, which may be integral with a crew member helmet, that outputs a crew member position/eye-position relative to the crew member cockpit, a transparent dynamic-darkening display covering at least one window in the crew member cockpit, and a scene imager sub-system having at least one scene imager either external to or inside the crew member cockpit. The scene imager system is configured to detect a presence of a high intensity light source and an emanation direction of the high intensity light source relative to the crew member cockpit. Finally, a computing device is connected to the crew member position/eye-position detection sub-system, the transparent dynamic-darkening display and the scene imager sub-system. The computing device controls the darkening of either a portion or an entire dynamic-darkening display upon the occurrence of either a high intensity light source having an intensity value equal to or greater than a predetermined threshold, and either the crew member position/eye-position being subject to a direct portion of the high intensity light source, or a substantial reflection of at least a portion of the high intensity light source reflected from a surface within the crew member cockpit.

The transparent dynamic-darkening display may include either an LCD element or an electrochromic element that may reflect back a significant portion of any incoming light from the high intensity light source. The transparent dynamic-darkening display may also include a plurality of addressable dynamic-darkening elements that substantively covers each window of a number of windows in the crew member cockpit. The window may also include a canopy that covers a substantial portion of the crew member cockpit, as disclosed below.

The scene imager may include a broad frequency range photo-detector configured to detect at least one frequency of the high intensity light source and the intensity value of the high intensity light source. Additionally, the scene imager may include an imager array configured to determine the emanation direction of the high intensity light source relative to the crew member cockpit.

The high intensity light source blocking system is configured to darken a portion of the dynamic-darkening display configured to be applied to two windows in the crew member cockpit, configured to be applied to all the windows in the crew member cockpit, and/or configured to include two different darkened portions of the dynamic-darkening display based on two crew members' positions/eye-positions relative to the crew member cockpit.

Figure 8:
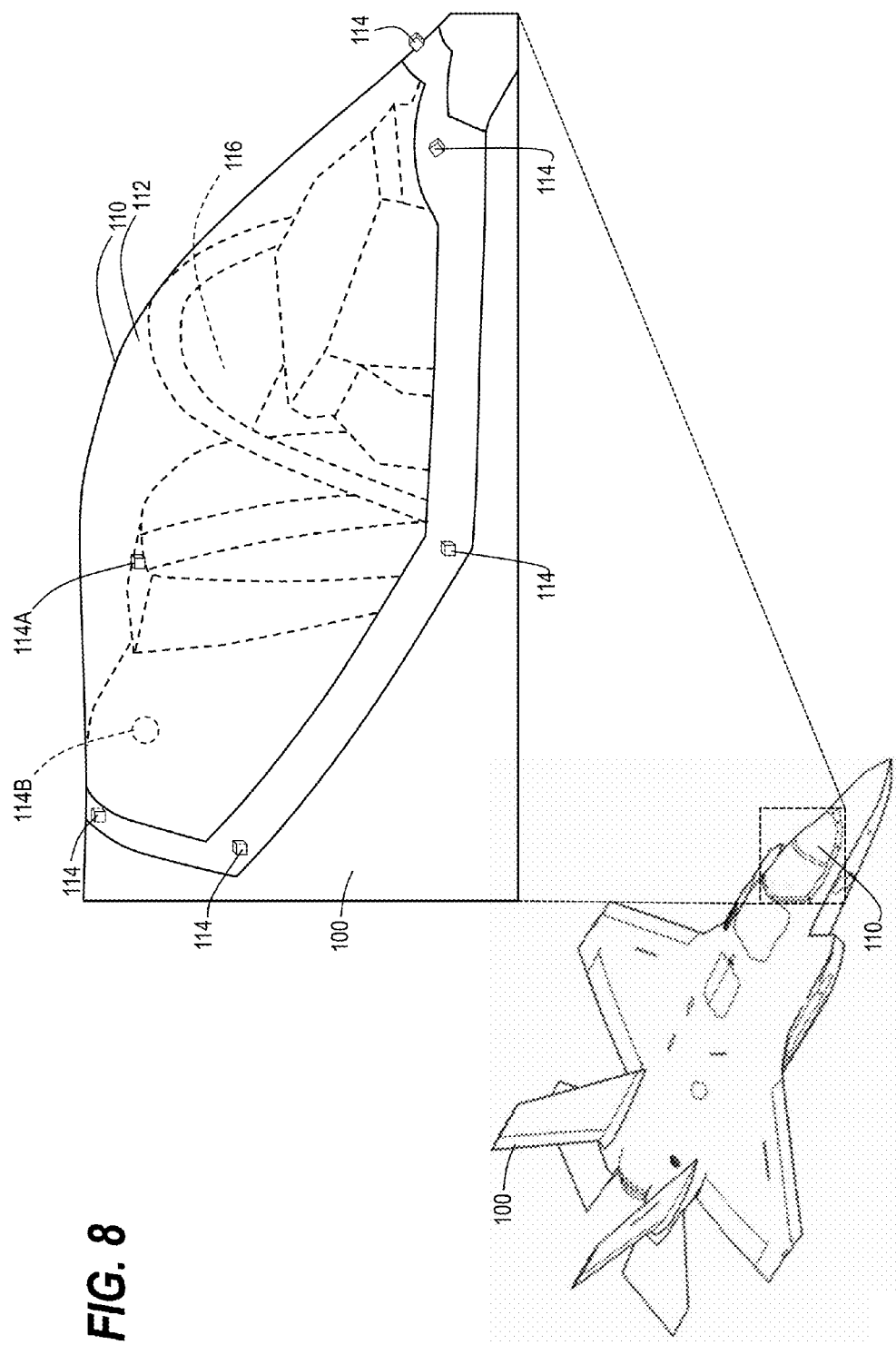
FIG. 8 illustrates a third embodiment of the high intensity light source blocking system on an aircraft with a cockpit enclosing canopy as disclosed herein.

FIG. 8 illustrates a third embodiment of the high intensity light source blocking system on an aircraft 100 with a cockpit enclosing canopy 110. An inside portion of canopy 110 includes a transparent dynamic-darkening display 112 attached thereto for displaying additional data to the crew member(s) and for particularly blocking high intensity light sources from injuring or dazzling the crew member(s). The particular application of the transparent dynamic-darkening display 112 with the canopy 110 is important since the canopy 110 allows much greater field-of-view visibility for the crew member(s) primarily for situational awareness. However, this advantage has the disadvantage that the crew member cockpit now is much more susceptible to high intensity light sources, for example, tactical weapons or even bright sunlight. In a similar manner to FIGS. 1-7, a scene imager system includes a number of scene imager photo-detectors 114 disposed around the periphery of the canopy 110 and external to the crew member cockpit 116.

Additionally, any number of scene imager photo-detector(s) 114A may be internally located within the crew member cockpit 116 to detect any high intensity light sources that enter the canopy 110 in the same manner as the externally mounted scene imager photo-detectors 114. The internally located scene imager 114A may also include a video camera that monitors the cockpit area for direct, scattered and reflective high intensity light sources as previously discussed. A video scene imager may employ a modeling function to determine what portions of the transparent dynamic-darkening display 112 need to be darkened based on a calculated path of a high intensity light source. Additionally, the video scene imager may employ a direct measurement function that determines which reflective surfaces or bright spots/areas in the cockpit may present a danger to the crew members and then determines which areas of the transparent dynamic-darkening display 112 need to be darkened to eliminate these dangerous bright spots/areas. Additionally, a scene imager photo-detector(s) 114B may also be transparently incorporated into various portions of the canopy 110 itself to detect a direction or presence of an incoming light source.

Figure 9:
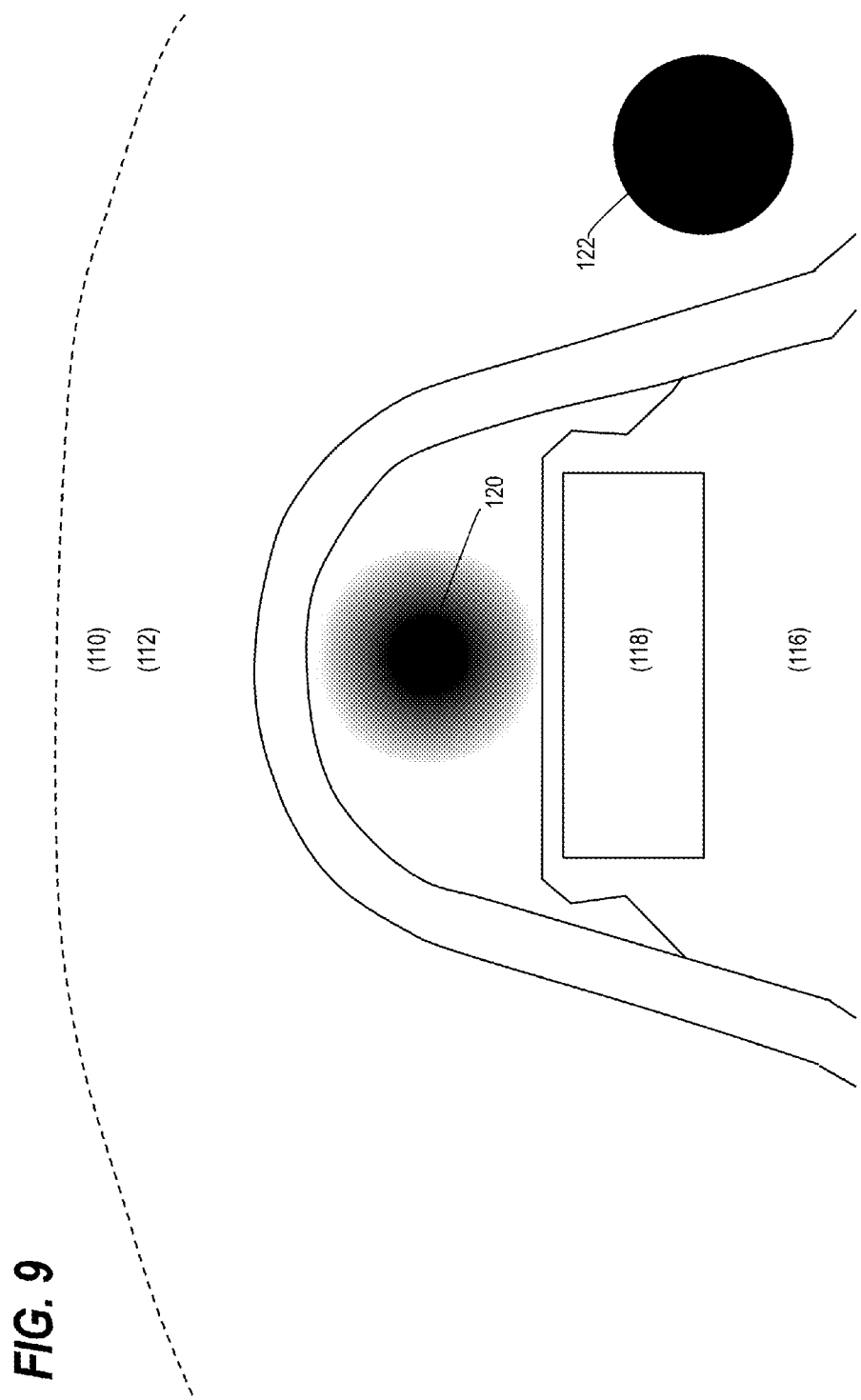
FIG. 9 illustrates the third embodiment of the high intensity light source blocking system on an aircraft with a cockpit enclosing canopy from a crew member cockpit view as disclosed herein.

FIG. 9 illustrates the third embodiment of the high intensity light source blocking system on an aircraft with a cockpit enclosing canopy 110 overlaid with a transparent dynamic-darkening display 112 from the view from a crew member cockpit 114. An avionics display 118 is configured in a forward direction to the crew member line-of-sight. A first darkened portion 120 in the transparent dynamic-darkening display 112 illustrates a gradient darkened portion where a central portion of the darkened portion 120 has a substantially 0% transparency, (substantially opaque light transmission), and the transparency increases to substantially 100% transparency, (substantially transparent light transmission), towards the outer periphery of the first darkened portion 120. This gradient darkening process allows crew members to have an increased visual field around the periphery of the area that is being darkened. FIG. 9 also illustrates a solid or substantially 0% transparency darkened portion 122 similar to FIGS. 3, 6 and 7.

Figure 10:
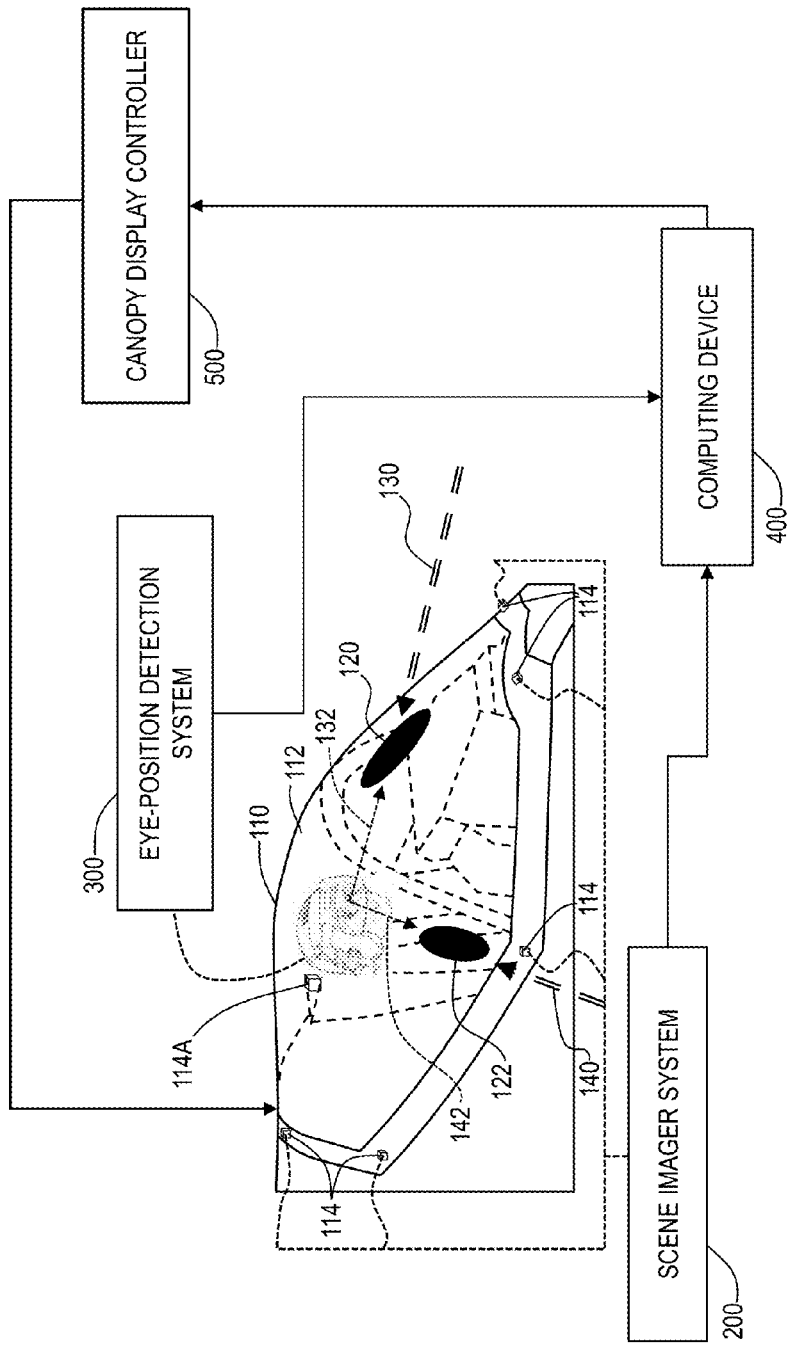
FIG. 10 illustrates a schematic diagram of subsystems comprising the high intensity light source blocking system on an aircraft or other vehicle as disclosed herein.

FIG. 10 illustrates a schematic diagram of subsystems comprising the high intensity light source blocking system on an aircraft or other vehicle as disclosed in FIG. 9. A scene imager system 200 processes the outputs of every scene imager 114 photo-detector or camera 114A to determine and output the light source intensity, the light source frequency and the light source direction relative to the crew member cockpit. Additionally, as previously discussed, any internally cockpit mounted scene imager has the ability to detect direct, scattered and reflected light sources relative to the crew member position/eye-position. A crew member position/eye-position detection system 300 detects and outputs a position/eye-position of a crew member relative to the interior of the cockpit. A portion of crew member position/eye-position detection system may reside in a crew member helmet, or may be internally mounted within the cockpit apart from any crew member helmet. All outputs from the scene imager system 200 and the crew member position/eye-position detection system 300 are first fed into a computing device 400 that calculates whether the light source intensity is equal to or above a predetermined threshold to initiate a complete darkening of the transparent dynamic-darkening display 112 by a canopy display controller 500.

If the light source intensity is below the predetermined threshold, then a portion, or portions, if more than one crew member position/eye-position input is received, are darkened on the transparent dynamic-darkening display 112 by means of the canopy display controller 500 when the crew member position/eye-position would be either in a direct line with an incoming high intensity light source at the transparent dynamic-display 112 on the canopy 110, or in an area where the high intensity light source would be scattered within the canopy 110 proximate the crew-member position/eye-position, or where the high intensity light source may be reflected off an interior surface of the cockpit or canopy itself in line with the crew-member position/eye-position.

For example, if a first high intensity light source 130 intersects with a crew members' calculated position/eye-position 132, the darkened area 120 is generated on the transparent dynamic-darkening display 112, in a manner similar to that shown in FIG. 9. Additionally, if a second high intensity light source 140 intersects with a crew members' calculated position/eye-position 142, the darkened area 122 is generated on the transparent dynamic-darkening display 112, in a manner similar to that shown in FIG. 9. These areas may darken on the canopy independent of whether the crew member is actually looking at either high intensity light source. In this manner, potential damage to the crew member's peripheral vision is prevented by blocking these light sources irrespective of the direction of the crew member's actual line-of-sight, but rather based on the actual position/eye-position of the crew member relative to the cockpit.

A summary of the embodiments presented in FIGS. 8-10 includes a high intensity light source blocking system for an aircraft operated by at least one crew member within a crew member cockpit, where the system includes an position/eye-position detection system that outputs a crew member position/eye-position relative to the crew member cockpit, a transparent dynamic-darkening display canopy covering the crew member cockpit, and a scene imager system having at least one scene imager either external to or inside the crew member cockpit. The scene imager system may be configured to detect a presence of a high intensity light source and an emanation direction of the high intensity light source relative to the crew member cockpit. The system further includes a computing device connected to the crew member position/eye-position detection system, the transparent dynamic-darkening display canopy and the scene imager system. The computing device controls the darkening of at least a portion of the dynamic-darkening display canopy upon the occurrence of either the high intensity light source having an intensity value equal to or greater than a predetermined threshold, and either the crew member position/eye-position being subject to a direct portion of the high intensity light source, or a substantial reflection of at least a portion of the high intensity light source reflected from a surface within the crew member cockpit.

The high intensity light source blocking system further is characterized by providing a portion of the dynamic-darkening display canopy that is darkened by a gradient portion which transitions between substantially 100% light transmission around a peripheral portion, to substantially 0% light transmission at a central portion.

Figure 11:
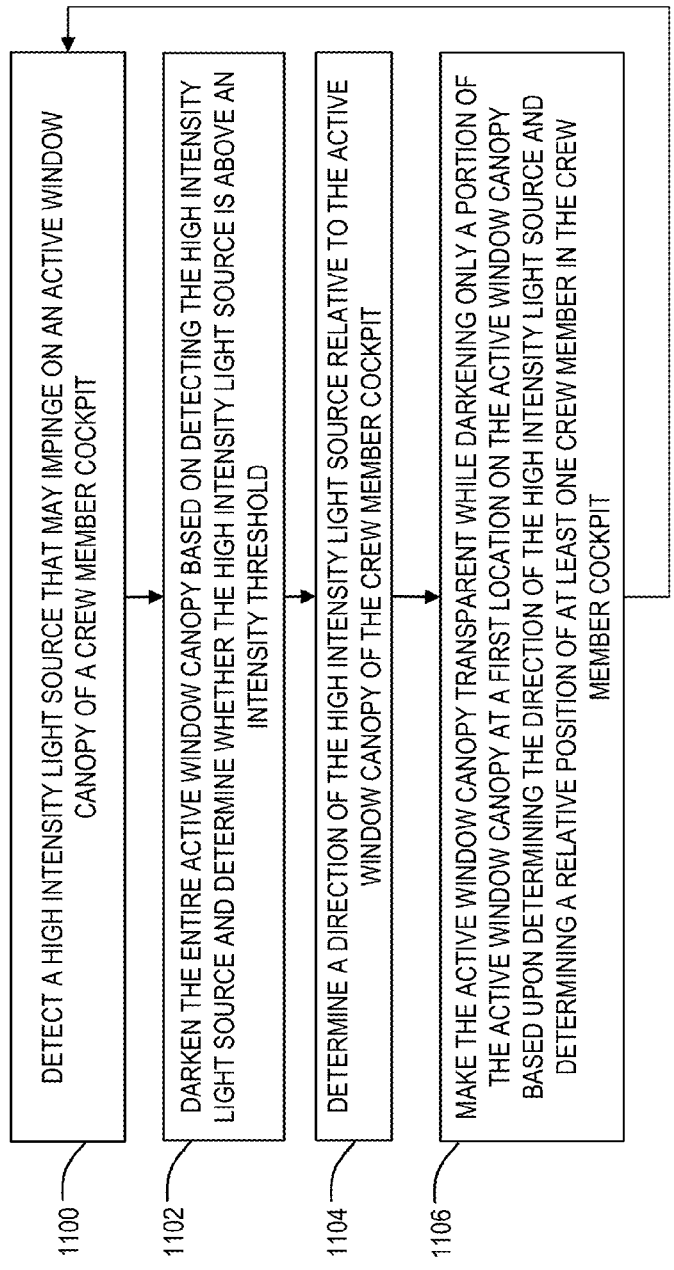
FIG. 11 illustrates a logic diagram flowchart for the high intensity light blocking source system as disclosed herein.

FIG. 11 illustrates a logic diagram flowchart for the high intensity light source blocking method that dynamically darkens an active window canopy of a crew member cockpit of an aircraft by detecting 1100 a high intensity light source that may impinge on an active window canopy of a crew member cockpit. The entire active window canopy is darkened 1102 based on detecting the high intensity light source and determine whether the high intensity light source is above an intensity threshold. A direction of the high intensity light source is determined 1104 relative to the active window canopy of the crew member cockpit. The active window canopy is then made transparent 1106 while darkening only a portion of the active window canopy at a first location on the active window canopy based upon determining the direction of the high intensity light source and determining a relative position of at least one crew member in the crew member cockpit.

Darkening the portion of the active window canopy at the first location further includes addressing a first series of addressable elements in a plurality of addressable dynamic-darkening elements (e.g., 120 of FIG. 10.) that comprise the active window 112 canopy 110, the first series of addressable elements corresponding to a first position/eye-position 132 of a first crew member in the crew member cockpit. A second series of addressable elements 122 is addressed in the plurality of addressable dynamic-darkening elements that comprise the active window 112 canopy 110, the second series of addressable elements 122 corresponding to either a second position/eye-position 142 of a second crew member in the crew member cockpit or the substantial reflection of the direction portion of the high intensity light source reflected from the surface within the crew member cockpit with respect to a first position/eye-position of a first crew member in the crew member cockpit.

Detecting the light source direction further configuring a plurality of photo-detectors 114 on a portion of the aircraft exterior to the crew member cockpit and within the interior of the crew member cockpit, and calculating the light source direction relative to the crew member cockpit based on a difference in received light intensity signals in at least two of the plurality of photo-detectors based upon low-level scattering in the air surrounding aircraft crew member cockpit, and/or the crew member cockpit.

The method may further include calculating a geo-location position of the light source based on the plurality of photo-detectors calculating the light source direction and a geospatial location system (e.g., GPS) on the aircraft configured to compute an aircraft geospatial location.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. A laser light blocking system for a vehicle operated by at least one crew member within a crew member cockpit, the system including:
   an eye-position detection system that outputs a crew member eye-position relative to the crew member cockpit;
   a transparent dynamic-darkening display covering at least one window in the crew member cockpit;
   a scene imager system configured to detect a presence of a laser light from a laser device and an emanation direction of the laser light relative to the crew member cockpit, the scene imager system comprising a plurality of one of photo-detectors and spectral intensity detectors on a portion of the vehicle exterior to the crew member cockpit and within the interior of the crew member cockpit;
   a computing device connected to the eye-position detection system, the transparent dynamic-darkening display and the scene imager system, the computing device controlling the darkening of at least a portion of the dynamic-darkening display upon the occurrence of:
      the laser light having an intensity value equal to or greater than a predetermined threshold; and
      the crew member eye-position being subject to at least one of at least a direct portion of the laser light, or a substantial reflection of at least a portion of the laser light reflected from a surface within the crew member cockpit, a laser light direction calculated relative to the crew member cockpit based on a difference in received light intensity signals in at least two of the plurality of one of photo-detectors and spectral intensity detectors based upon low-level scattering in one of
      the air surrounding aircraft crew member cockpit, and
      the crew member cockpit.

2. The laser light blocking system according to claim 1, the eye-position detection system including one of:
   an eye-position detecting sensor integral with a crew member helmet; or
   a crew member cockpit mounted eye-position detecting sensor.

3. The laser light blocking system according to claim 1, the transparent dynamic-darkening display comprising at least one of a Liquid Crystal Display (LCD) element and an electrochromic element.

4. The laser light blocking system according to claim 3, the transparent dynamic-darkening display comprising a plurality of addressable dynamic-darkening elements that substantively covers the at least one window in the crew member cockpit.

5. The laser light blocking system according to claim 1, the at least one window in the crew member cockpit comprising a plurality of windows, where each of the plurality of windows is covered by the transparent dynamic-darkening display.

6. The laser light blocking system according to claim 1, the at least one window in the crew member cockpit comprising a canopy that covers a substantial portion of the crew member cockpit.

7. The laser light blocking system according to claim 1, the at least one scene imager comprising a broad frequency range one of a photo-detector and a spectral intensity detector configured to detect at least one frequency of the laser light and the intensity value of the laser light.

8. The laser light blocking system according to claim 7, the at least one scene imager further comprising an imager array configured to determine the emanation direction of the laser light relative to the crew member cockpit.

9. The laser light blocking system according to claim 1, the at least a portion of the dynamic-darkening display:
- configured to applied to at least two windows in the crew member cockpit;
- configured to applied to all windows in the crew member cockpit; or
- comprises two different portions of the dynamic-darkening display based on at least two crew members' eye-position relative to the crew member cockpit.

10. A laser light blocking system for an aircraft operated by at least one crew member within a crew member cockpit, the system including:
- an eye-position detection system that outputs a crew member eye-position relative to the crew member cockpit;
- a transparent dynamic-darkening display canopy covering the crew member cockpit;
- a scene imager system configured to detect a presence of a laser light from a laser device and an emanation direction of the laser light relative to the crew member cockpit, the scene imager system comprising a plurality of one of photo-detectors and spectral intensity detectors on a portion of the vehicle exterior to the crew member cockpit and within the interior of the crew member cockpit;
- a computing device connected to the eye-position detection system, the transparent dynamic-darkening display canopy and the scene imager system, the computing device controlling the darkening of at least a portion of the dynamic-darkening display canopy upon the occurrence of:
  - the laser light having an intensity value equal to or greater than a predetermined threshold; and
  - the crew member eye-position being subject to at least one of at least a direct portion of the laser light, or a substantial reflection of at least a portion of the laser light reflected from a surface within the crew member cockpit, a laser light direction calculated relative to the crew member cockpit based on a difference in received light intensity signals in at least two of the plurality of one of photo-detectors and spectral intensity detectors based upon low-level scattering in one of
    - the air surrounding aircraft crew member cockpit, and
    - the crew member cockpit.

11. The laser light blocking system according to claim 10, the eye-position detection system comprising one of:
- a sensor integral with a crew member helmet; and
- crew member cockpit sensors.

12. The laser light blocking system according to claim 10, the transparent dynamic-darkening display canopy comprising:
- a plurality of addressable dynamic-darkening elements that substantively cover the transparent dynamic-darkening display canopy; and
- at least one of a Liquid Crystal Display (LCD) element and an electrochromic element.

13. The laser light blocking system according to claim 10, the at least one scene imager comprising an imager array of one of broad frequency range photo-detectors and spectral intensity detectors configured to:
- detect at least one frequency of the laser light and the intensity value of the laser light; and
- determine the emanation direction of the laser light relative to the crew member cockpit.

14. The laser light blocking system according to claim 10, the at least a portion of the dynamic-darkening display canopy that is darkened further comprises darkening a gradient portion configured to transition between substantially transparent light transmission around a peripheral portion, to substantially opaque light transmission at a central portion.

15. A method that dynamically darkens an active window canopy of a crew member cockpit of an aircraft, the method comprising:
- detecting a laser light from a laser device impinging on an active window canopy of a crew member cockpit;
- darkening the entire active window canopy based on detecting the laser light and determining whether the laser light is above an intensity threshold;
- configuring a plurality of one of photo-detectors and spectral intensity detectors on a portion of the aircraft exterior to the crew member cockpit and within the interior of the crew member cockpit;
- calculating a laser light direction relative to the crew member cockpit based on a difference in received light intensity signals in at least two of the plurality of one of photo-detectors and spectral intensity detectors based upon low-level scattering in one of
  - the air surrounding aircraft crew member cockpit, and
  - the crew member cockpit; and
- making the active window canopy transparent while darkening only a portion of the active window canopy at a first location on the active window canopy based upon determining the direction of the laser light and determining a relative position of at least one crew member in the crew member cockpit.

16. The method that dynamically darkens an active window canopy according to claim 15, where the darkening only the portion of the active window canopy at the first location further includes:
- addressing a first series of addressable elements in a plurality of addressable dynamic-darkening elements that comprise the active window canopy, the first series of addressable elements corresponding to a first relative position of a first crew member in the crew member cockpit.

17. The method that dynamically darkens an active window canopy according to claim 16, where the darkening only the portion of the active window canopy at the first location further includes:
- addressing a second series of addressable elements in the plurality of addressable dynamic-darkening elements that comprise the active window canopy, the second series of addressable elements corresponding to one of:
  - a second relative position of a second crew member in the crew member cockpit; and
  - the substantial reflection of the direction portion of the laser light reflected from the surface within the crew member cockpit with respect to a first relative position of a first crew member in the crew member cockpit.

18. The method that dynamically darkens an active window canopy according to claim 15, further comprising calculating a geo-location position of the laser light based on the plurality of one of photo-detectors and spectral intensity detectors calculating the laser light direction and a geospatial location system on the aircraft configured to compute an aircraft geospatial location.

19. The method that dynamically darkens an active window canopy according to claim 15, the darkening at least the portion of the active window canopy further comprises darkening a gradient portion of the active window canopy configured to transition between substantially transparent light transmission around a peripheral portion, to substantially opaque light transmission at a central portion.

20. The method that dynamically darkens an active window canopy according to claim 15, wherein the determining the relative position of that at least one crew member in the crew member cockpit further comprises:
  determining a crew member eye-position for the at least one crew member in the crew member cockpit.

21. The method that dynamically darkens an active window canopy according to claim 20, wherein making the active window canopy transparent while darkening only a portion of the active window canopy at a first location on the active window canopy further comprises:
  determining the direction of the laser light when the crew member eye-position for the at least one crew member is in one of
    a direct portion of the high intensity light source; and
    a substantial reflection of the direct portion of the laser light reflected from the surface within the crew member cockpit.

* * * * *